United States Patent
Parr

(10) Patent No.: US 10,650,027 B2
(45) Date of Patent: May 12, 2020

(54) ACCESS ACCELERATOR FOR ACTIVE HBASE DATABASE REGIONS

(71) Applicant: International Business Machines Corporation, Armonk, NY (US)

(72) Inventor: Francis N. Parr, New York, NY (US)

(73) Assignee: International Business Machines Corporation, Armonk, NY (US)

(*) Notice: Subject to any disclaimer, the term of this patent is extended or adjusted under 35 U.S.C. 154(b) by 28 days.

(21) Appl. No.: 14/533,380

(22) Filed: Nov. 5, 2014

(65) Prior Publication Data

US 2016/0124857 A1 May 5, 2016

(51) Int. Cl.
*G06F 16/28* (2019.01)
*G06F 16/2455* (2019.01)
*G06F 12/0862* (2016.01)

(52) U.S. Cl.
CPC ........ *G06F 16/28* (2019.01); *G06F 16/24561* (2019.01); *G06F 12/0862* (2013.01); *G06F 2212/461* (2013.01); *G06F 2212/462* (2013.01); *G06F 2212/463* (2013.01); *G06F 2212/465* (2013.01)

(58) Field of Classification Search
CPC .......... G06F 12/0862; G06F 17/30587; G06F 17/30578; G06F 17/30306; G06F 17/30584; G06F 2212/1024; G06F 2212/1021; G06F 2212/602; G06F 2212/463; G06F 2212/462; G06F 2212/465; G06F 2212/461; G06F 16/28; G06F 16/24561

See application file for complete search history.

(56) References Cited

U.S. PATENT DOCUMENTS

| | | | | |
|---|---|---|---|---|
| 6,463,509 B1* | 10/2002 | Teoman | ................ | G06F 9/4401 711/113 |
| 6,728,840 B1* | 4/2004 | Shatil | .................. | G06F 12/0866 707/999.003 |
| 8,271,737 B2* | 9/2012 | Chen | ................... | G06F 12/0804 711/118 |
| 2011/0066808 A1* | 3/2011 | Flynn | .................. | G06F 12/0246 711/118 |
| 2013/0110883 A1 | 5/2013 | Junqueira et al. | | |
| 2013/0185337 A1 | 7/2013 | Lipcon | | |
| 2014/0258605 A1* | 9/2014 | Cai | ........................ | G06F 12/12 711/105 |

* cited by examiner

*Primary Examiner* — David Yi
*Assistant Examiner* — Alan Otto
(74) *Attorney, Agent, or Firm* — Isaac J. Gooshaw; Nicholas L. Cadmus

(57) ABSTRACT

In a method for improving performance of a database, create, in a memory, an instance of a segment of data corresponding to a segment of data in a database on a persistent file system. The segment of data in the database on the persistent file system is expected to experience a high plurality of reads and writes during a certain time period. Receive a request to modify the segment of data in the database on the persistent file system. Modify the instance of the segment of data in the memory.

20 Claims, 9 Drawing Sheets

HAS instances for sequence of advancing time periods growing the BDDB key space

ACCESS ACCELERATOR FOR ACTIVE HBASE DATABASE REGIONS

BACKGROUND OF THE INVENTION

The present invention relates generally to database architectures and operation, and more specifically to enhancing performance of an HBase on data in data regions that experience an abundance of reads and writes.

Database structures have evolved as their uses, contents, sizes, and supporting hardware have evolved. Traditional Relational Database Management Systems (RDBMS) are oriented toward maintaining the integrity of database transactions in real time (e.g., an airline reservation system or financial market transaction system), contain tables of structured data on which involved operations may be performed during a query, and are based on the concept of a shared disk subsystem. A RDBMS may be accessed with Structured Query Language (SQL), a data manipulation language, to manage, access, and operate on a content of the RDBMS. RDBMS was originally formed to run on a single machine and doesn't easily leverage the performance and economic advantages of running on a cluster of many smaller and cheaper machines. As software and hardware capabilities and interest in analyzing and manipulating large amounts of diversified and sometimes unstructured data (termed big data) has increased, scalable, distributed databases have been created using dynamic, semi-structured or wide column table formats that are populated with persistent data. For example, horizontally scalable databases called noSQL databases have become popular. The name noSQL is an ill-defined term given to a growing number of mostly non-relational open-sourced databases that may not provide atomicity, consistency, isolation and durability guarantees that are key attributes of classic relational database systems, but are amenable to scaling horizontally, i.e., by using more machines. NoSQL databases are finding significant and growing use for large data volumes and real-time web applications on large distributed systems.

There are several types of noSQL databases that can be classified by the data model they use. Bigtable and HBase are examples of noSQL databases that use a key-value data model, a model that can provide high performance, high scalability, high flexibility, and design simplicity. HBase is a sparse, distributed, persistent, multidimensional sorted map, which is indexed by row key, column key, and timestamp. A key-value database enables an application to store data in a schema-less way with no database-aware data structure that is built into the database. Key-value database systems are often distributed among multiple computing systems for to enhance performance and often exhibit high performance on sequential writes or sequential reads, but much lower performance when servicing a mixture of reads and writes to a same data region in the database. HBase is implemented using Hadoop as a scalable resilient underlying file system.

SUMMARY

According to an embodiment of the present invention, a method for improving performance of a database. The method includes creating, in a memory, an instance of a segment of data corresponding to a segment of data in a database on a persistent file system, wherein the segment of data in the database on the persistent file system is expected to experience a high plurality of reads and writes during a certain time period. The method further includes receiving a request to modify the segment of data in the database on the persistent file system. The method further includes modifying, by one or more processors, the instance of the segment of data in the memory.

DETAILED DESCRIPTION OF THE DRAWINGS

Figure 1:
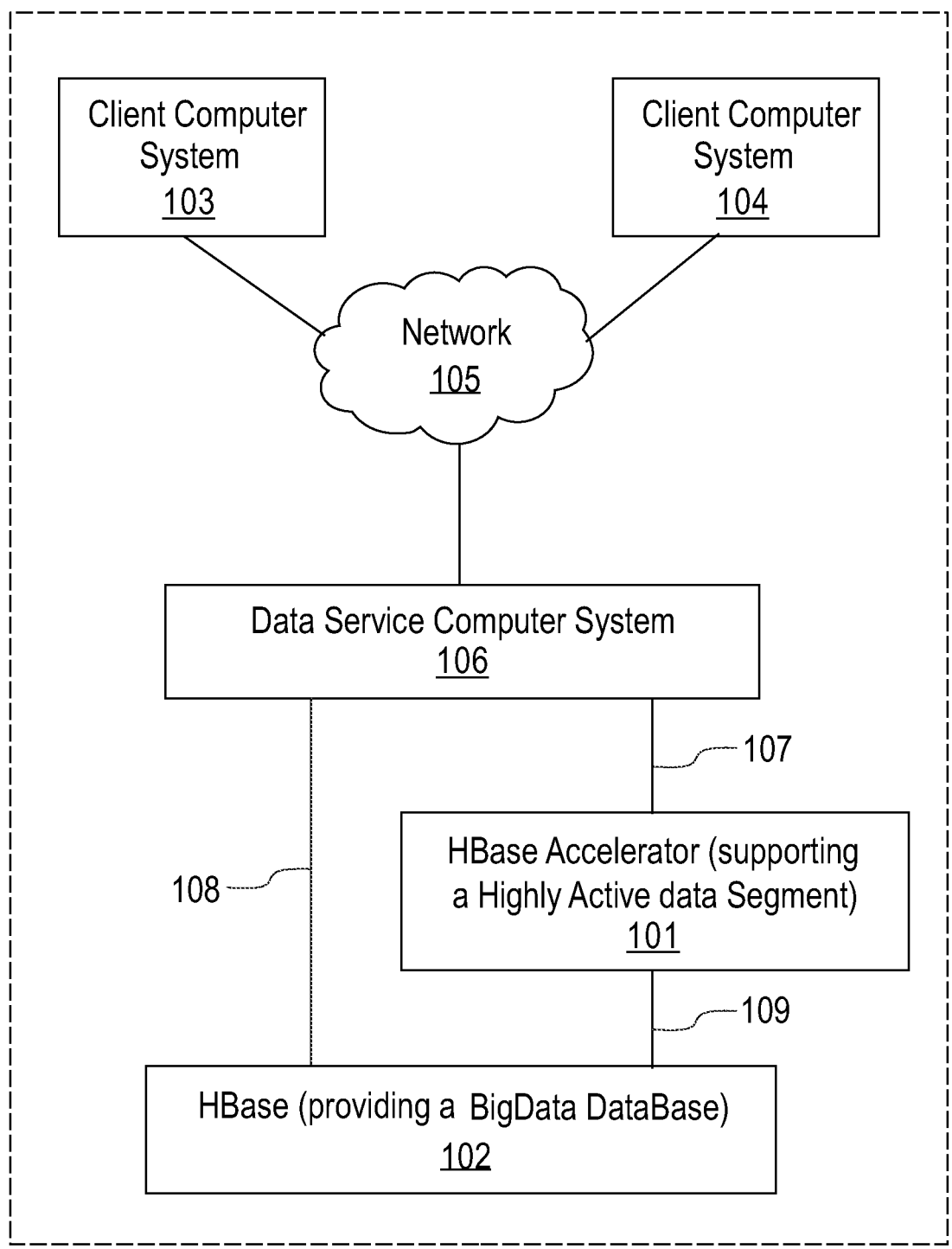
FIG. 1 depicts a block diagram of an overall data processing environment, in accordance with an embodiment of the present invention.

During operation of some applications working with data in a key-record database, it is possible to identify a specific segment of the data, the Highly Active Segment (HAS), which for an identified period of time is the subject of intense mixed read write traffic. In an embodiment of the present invention, it can be determined whether a particular record belongs to the HAS either by its key values or possibly because values in the record link it to data which is known to be in the HAS. An illustrative example occurs in databases where "time and date of transaction" is a top level part of the record keys. The preponderance of updates in each day, and associated read operations to make those updates to the database, will be for the current date since that is the time segment for which new information is being added. Some limited updating of a previous day's information will occur but only when corrections need to be applied to incorrectly entered or incomplete information associated with a previous day's transaction.

The HAS is part of a larger "Big data" collection of data, the BigData-DataBase (BDDB). The BDDB allows for retrieving and updating data for the larger collection with much lower write traffic intensity. Access to the BDDB is dominated by read-mostly retrievals. At the time when a particular HAS ends its period of intensive read/write use, the data in that segment becomes fully integrated with the larger BDDB collection and is retrievable by the regular search and update methods available with the BDDB. Resources associated with meeting the high traffic performance requirements of the old HAS can then be released and a new HAS, where intensive read/write traffic is just beginning, can be established.

An embodiment of the present invention provides both (1) rapid and efficient read and write operations handling on data in the HAS and (2) migration of the information of HAS data to the larger BDDB so that retrieval operations on the BDDB do not have to be aware of movements of the HAS boundary over time. The retrieval operations can be organized as searches of the overall BDDB collection of information without regard to the fact that insertion of new information has been accelerated using a HAS. The retrieval operations can retrieve all information which has completed its migration from the HAS to the BDDB. Acceleration of mixed read and write operations to data in the HAS is achieved by ensuring that all HAS data in stored in a semiconductor storage system, something which cannot be done cost effectively in the larger BDDB collection of data. The HAS is effectively a preprocessing step, holding new information temporarily before it is passed into the BDDB. An embodiment of the present invention, both allows accelerated mixed read and write processing of the new data in the HAS while maintaining a clean BDDB based retrieval interface for search applications accessing the overall BDDB data collection.

In an embodiment of the present invention, transfer of new data from the HAS to the BDDB occurs incrementally during the life of the current HAS but with a delay before that data becomes visible in the BDDB. In this embodiment, BDDB queries will not see the most recent information arriving at the HAS, BDDB queries on the collection of information visible to it will have no impact on performance of read and write operations in the HAS and a loose coupling of the HAS and BDDB implementations is possible. In another embodiment of the present invention, transfer of data from the HAS to the BDDB occurs only at the end of the HAS active period (e.g., when a new independent HAS is already established and is handling the intense traffic of read and write operations for data arriving for that segment). In this embodiment, the implementations of the HAS and the BDDB are more tightly integrated, all arriving information is visible to BDDB queries but it is possible for BDDB queries to slow down HAS processing of new incoming information when they access the HAS portion of the BDDB key space.

FIG. 1 depicts data processing environment 100 that includes client computer system 103, client computer system 104, and data service computer system 106, in accordance with an embodiment of the present invention. Client computer systems 103, 104, and the data service computer system 106 are connected to network 105. Also, data service computer system 106 is attached to both the HBase Accelerator 101, providing HAS support, by connection 107 and to the HBase 102, providing BDDB support, by connection 108. HBase Accelerator 101 is also connected directly HBase 102 by connection 109. Data processing environment 100 may include additional computing devices, servers, or other devices not shown.

HBase accelerator 101 contains all data in the current highly active segment (HAS) of the key space that is expected to experience a plurality of reads and writes. The data in the current HAS is typically newly arriving data becoming available during the lifetime of the current HAS. In an embodiment, connection 107 carries newly arriving information flowing into the HAS on HBase accelerator 101 together with information read from the HAS on HBase accelerator 101 by data service computer system 106 needed to correctly link the newly arriving information with other data in the HAS. In an embodiment, connection 108 carries mostly read query requests to the BDDB on HBase 102 and returns the responses to those requests. In an embodiment, connection 109 carries the newly arrived information created in the HAS on HBase accelerator 101 to the BDDB on HBase 102 to make it accessible to queries directed to the BDDB. In other embodiments, this migration may occur during the active period of the HAS or at a later time.

Data service computer system 106 is a server computing system. In other embodiments, data service computer system 106 may be a desktop computer, laptop computer, tablet computer, personal digital assistant (PDA) or a distributed computing system. In general, data service computer system 106 may be any computing device capable of sending and receiving data, and communicating with network 105 and HBase Accelerator 101. In general, client computer systems 103 and 104 may be any computing device capable of sending and receiving data, and communicating with network 105.

Data service computer system 106 provides a service interface for data requests from the network 105 and from client computer systems 103 and 104. Data service computer system 106 then redirects and decomposes these data requests as necessary to direct subrequests to HBase accelerator 101 or to the BDDB on HBase 102 using connections 107 and 108 respectively.

Network 105 may be a local area network (LAN), a wide area network (WAN) such as the Internet, the public switched telephone network (PSTN), a mobile data network (e.g., wireless internet provided by a third or fourth generation of mobile phone mobile communication), a private branch exchange (PBX), any combination thereof, or any combination of connections and protocols that will support communications between client computer systems 103, 104 and data service computer system 106 in accordance with embodiments of the invention. Network 105 may include wired, wireless, or fiber optic connections.

HBase Accelerator 101 supports a HAS of the data key space where a significant fraction of the newly arriving information is to be inserted. The newly arriving information may come from client computing system 103, client computing system 104, or from other data sources connected to network 105. Data service computer system 106 directs this information to HBase accelerator 101 over connection 107. Data service computer system may also read from the HAS on HBase accelerator 101 to gather information needed correctly index and link the newly arriving data in the HAS. In one embodiment, queries from client computer systems 103 or 104, and from other devices attached to network 105 arriving at data service computer system 106 are mainly sent directly (using connection 108) to the BDDB on HBase. Only in the case where a query requires access to the most recent data in the HAS and in an embodiment where the implementation of HAS and BDDB are closely integrated will a subquery be extracted from the client BDDB request by data service computer system 106 and directed to the HBase accelerator 101 over connection 107 to obtain HAS relevant data for the client request.

Figure 2:
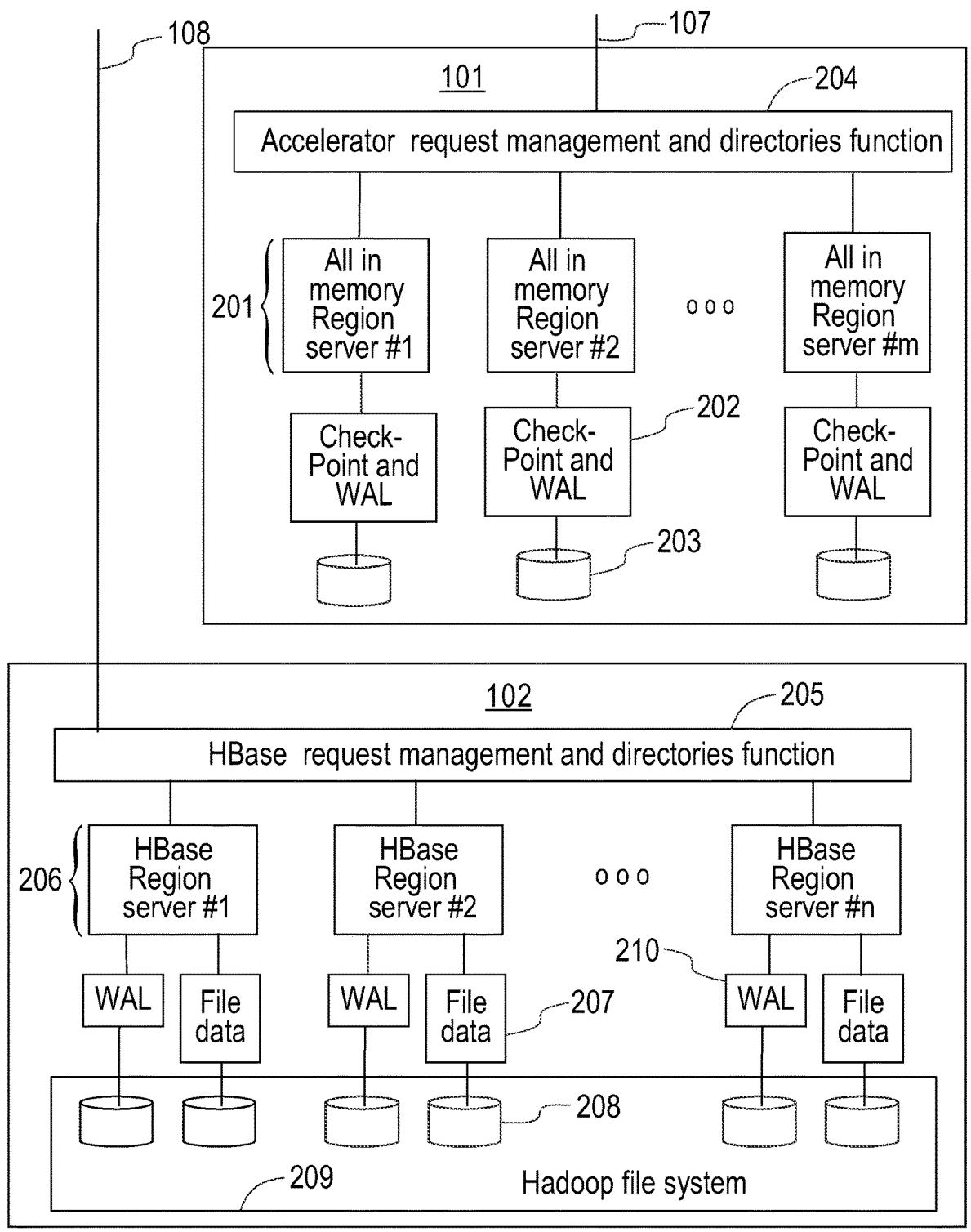
FIG. 2 is a detailed diagram of an HBase Accelerator supporting a Highly Active Segment (HAS) of key space and a BigData Database HBase in the data processing environment of FIG. 1, in accordance with an embodiment of the present invention.

FIG. 2 depicts HBase Accelerator 101 supporting a HAS and a BDDB service implemented using HBase 102 and Hadoop file system 209, in accordance with an embodiment of the present invention. The organization of the HBase implementation of a BDDB in HBase 102 is in accordance with techniques known in the art. The key space of the BDDB is organized into many regions served by a set of HBase region servers 206 (e.g., HBase region server 1, HBase region server 2, through HBase region server n). PUT and GET requests to create, update, or retrieve records with a specific key value arrive over connection 108 and are distributed by HBase request management and directories function 205 which forwards each request to an HBase region server of HBase region servers 206 handling the requested region of key space. Each HBase region server maintains cached updated copies of some of its record data in memory, but maintains most of the record data in persistent files (e.g., file data 207 for HBase region server 2) stored on non-volatile magnetic memory (e.g., non-volatile magnetic memory 208 for HBase region server 2) in a resilient scalable file system such as Hadoop file system 209. To ensure that new data in PUT requests cannot be lost as a result of a region server failure before it is written out in persistent file form, an HBase region server uses a Write Ahead Log (WAL) (e.g., WAL 210 for HBase region server n) to immediately write updates into a persistent memory to allow reconstruction of that request after a failure.

HBase accelerator 101 provides accelerated processing for records in the HAS portion of key space mainly consisting of new records to eventually be added to the BDDB collection. A distinguishing feature of HBase accelerator 101 is that it maintains all HAS record data in fast electronic storage e.g., in memory. To support a scalable HAS with general purpose processing systems each of which will allow attachment of a limited amount of electronic memory, HBase accelerator 101 partitions the HAS key space into a plurality of regions and provides an all in memory region server for each region (e.g., all in memory region servers 201). The fact that all the record data of the HAS is always available within memory allows for an organization of this data which can handle a stream of mixed PUT and GET requests rapidly and efficiently. PUT and GET requests to create, update or retrieve HAS records arrive over connection 107 and each is forwarded to the appropriate all in memory region server by HBase accelerator request management and directories function 204. A recovery scheme is needed to address possible failure of any of the all in memory region servers and subsequent recovery of all the record data stored in their volatile electronic memory. This is accomplished by periodically check-pointing all the (in memory) records of each all in memory region server to non-volatile resilient storage (e.g., non-volatile resilient storage 203 for all in memory region server 2) and also maintaining a Write Ahead Log (WAL) of PUT data since the last checkpoint using a checkpoint and WAL function (e.g., check point and WAL function 202 for all in memory region server 2).

Figure 3:
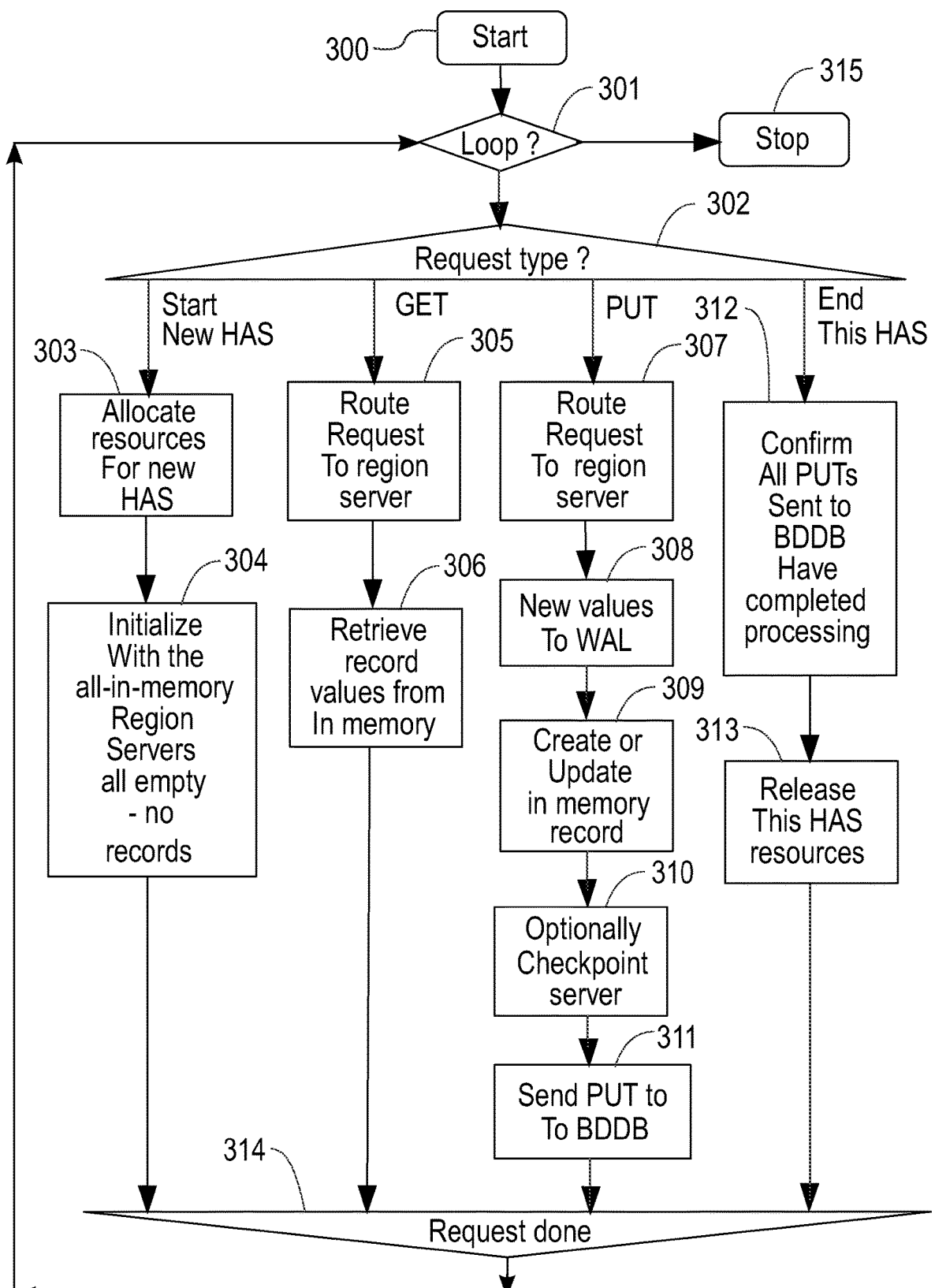
FIG. 3 is a flowchart showing the processing of operations in the HBase Accelerator where updates are forwarded incrementally but asynchronously to the BDDB during the period of activity of the HAS, in accordance with an embodiment of the present invention.

FIG. 3 is a flowchart showing the processing of operations in HBase Accelerator 101 where updates are forwarded incrementally but asynchronously to the BDDB during the period of activity of the HAS, in accordance with an embodiment of the present invention.

Processing starts at step 300. Requests arriving from the data service computer system 106 are handled by an open ended loop in HBase accelerator 101. Loop decision 301 determines whether more requests are expected and stops the flow at Stop 315 if more requests are not expected.

Path selection element 302 separates out the different request types processed by HBase accelerator 101: (1) start a new HAS instance; (2) GET a record; (3) PUT a record; and (4) end this HAS instance. Start a new HAS is used when a new Highly Active Segment (HAS) instance is started, for example, to capture all arriving data records occurring in a new time period. Processing of a start new HAS request begins with allocating memory, processing, directory, and log resources in HBase accelerator 101 for the new HAS instance in step 303. This will include allocation for a set of all in memory region servers 201 for the new HAS instance and its associated partitioning of HAS key space. In step 304, each all in memory region server of all in memory region servers 201 is initialized to start empty with no contained records. This completes processing of the start new HAS instance with flow into the request done convergence block 314 with flow from there back to the top of the request handling loop at loop decision 301.

Once a HAS instance is started, GET and PUT requests can arrive to be handled in that HAS instance. A GET request is a request to retrieve the values of a particular record with a designated key in the HAS key space. Processing a GET request begins with routing of the request to the appropriate all in memory region server handling that key value. The routing is performed by HBase Accelerator request management and directories function 204 and is represented by step 305 in the flow. In the following step, step 306, the appropriate all in memory region server handling that key value retrieves values for the requested records from its memory or returns a code indicating that no record with that key exists in the HAS and implicitly in the BDDB. Processing of the GET is then complete; control flows to request done convergence block 314 and back to the top of the request handling loop at loop decision 301.

A PUT request is a request to either update or create a new record with specified key values. If the record already exists its field values are to be updated with data provided in the PUT requests; if that record does not exist, a new record is to be created. Processing the PUT request starts in step 307 with HBase Accelerator request management and directories function 204 routing the PUT request to the appropriate all in memory region server. Next in step 308, to ensure that the values in the PUT request are recoverable even after a failure of the appropriate all in memory region server, the values are written to the write ahead log (WAL). Next, in step 309, the update for the PUT is then applied to update or create the appropriate keyed record in memory in the appropriate all in memory region server. In an embodiment, where the HAS is being used to prepare complete records for the HAS active period which will then be migrated into the BDDB, a single value of each keyed record will be maintained in memory. Alternate embodiments of the invention with a plurality of versioned values in memory are possible. In step 310, a determination of the current time or number of PUT requests handled, make it appropriate to perform a checkpoint of all records in this all in memory server to further protect against server failure. Finally, in step 311 the PUT is forwarded to the BDDB on HBase 102 for asynchronous processing there.

The performance benefit of HBase accelerator 101 is that it is doing all the work of reading and writing HAS records to prepare a processed and assembled PUT only request for forwarding asynchronously to the BDDB. Prior art HBase implementations have significantly better performance for a pure PUT stream than for a mixed PUT GET stream of requests. Hence by capturing all mixed PUT and GET processing in the HBase accelerator and serving it entirely out of memory in a HAS leads to significantly accelerated overall system performance since mixed PUT GET streams can be handled efficiently and rapidly when all necessary data is already available in electronic memory in the all in memory servers of the HAS instance. By forwarding the PUT requests to the BDDB asynchronously, the HAS processing in the HBase accelerator is not slowed down waiting for these updates to be applied in the prior art BDDB. The information available and visible in that database will just lag behind the most recently available values in the HBase accelerator. Some arbitrariness in the delay from the transaction time of a business event to the time at which that event becomes visible to queries in the BDDB is unavoidable in many applications. The dominant factors in the amount of delay are more likely to be vagaries in the times at which sources report business data and delays in network transition and data validation processing. Some small additional uncertainty in delay to visibility introduced by asynchronous messaging of updates already applied in the HAS to get them applied and visible in the BDDB is acceptable when this is the case. Since it is known that the most recent new and arriving data for the current HAS subspace of BDDB key space, it is often acceptable for queries to the BDDB to experience some small delay before new prepared data records become visible there.

An END HAS instance request indicates that the period of activity of this HAS instance has come to an end. The processing for this requests start with action in step 312 to confirm that all PUTs sent asynchronously to the BDDB on HBase 201 in step 311 in the PUT processing flow have completed processing successfully. If any of these updates failed, they can be replaced with the latest updated values for those key values currently available in the HAS. When this is completed, all useful information in the current HAS instance has been transferred over to the BDDB where it will be available to queries there and hence resources associated with this HAS instance can be released (step 313).

Figure 4:
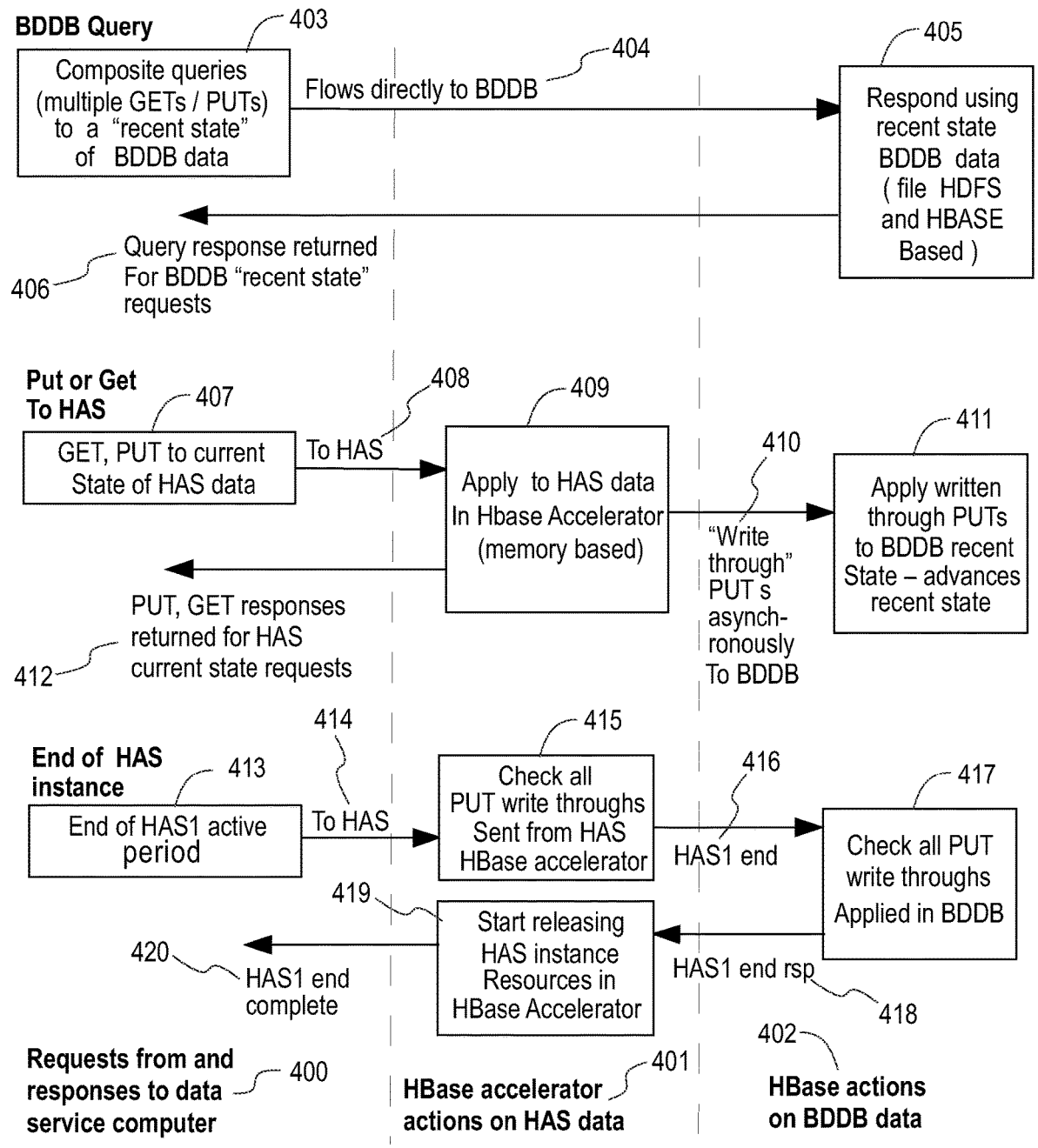
FIG. 4 is a protocol diagram showing interactions between the data services computer system, the HBase accelerator, and the HBase providing BDDB implementation, in accordance with an embodiment of the invention where updates are forwarded incrementally but asynchronously to the BDDB during the period of activity of the HAS.

FIG. 4 is a protocol diagram showing interactions between data services computer system 106, HBase accelerator 101, and HBase 102 implementing a BDDB in accordance with an embodiment of the present invention where updates are forwarded incrementally but asynchronously to the BDDB during the period of activity of the HAS. In this diagram the leftmost vertical column 400, shows actions, specifically requests from and responses to data services computer system 106 as it in turn serves client computer systems 103 and 104 providing them with an access path to data in the BDDB and HAS. Central column 401, shows the functions performed by HBase accelerator 101 as it processes HAS data and interacts with HBase 102 implementing the BDDB in response to these requests. The rightmost column 402, shows functions performed by the BDDB support provided by HBase 102 as part of the interactions. The interaction in FIG. 4 shows three independent interactions: (1) service of a BDDB query starting at interaction 403; (2) service of PUT or GET commands to HAS data starting at interaction 407; and (3) interactions occurring at the end of the active period of a HAS instance starting at interaction 413.

The BDDB query interaction in interaction 403 occurs when one of client computer systems 103 or 104 requests data service computer system 106 to perform a composite query on the broader collection of BDDB data. A composite query consists of a set of one or more GET and PUT operations to be applied against the collection of BDDB data. Since the HAS represents only a small segment of the overall BDDB key space and typically contains recently arrived new data only, the embodiment represented in FIG. 4 responds to the query with values for a recent state of the BDDB without committing that the latest data received in the HAS (but not yet forwarded to the BDDB) will be visible and included in the response to the query. FIG. 4 shows the query request in interaction 403 flowing directly to the BDDB in interaction 404 without interacting with HBase accelerator 101. In interaction 405, HBase 102, providing BDDB support processes the query against the data available to it which will be a recent state of BDDB data. This response is then passed back directly to data service computer system 106 in interaction 406 which in turn can respond to with this information to which ever client computer system initiated the interaction. Connection 108 is used to pass requests directly from data service computer system 106 to HBase 102 providing the BDDB.

The PUT or GET to HAS request in interaction 407 occurs when one of the client computer systems 103 or 104 is preparing and submitting new data associated with current HAS and validation, data cleansing, data linking, or indexing is required in preparation for including this new information on the overall BDDB collection. Performing these validation cleansing, linking, and indexing on a new HAS creates a need for a plurality of PUT and GET operations to be performed on the HAS data. If the arrival rate of new data from clients is high, efficiency and performance of these PUT and GET operations is critical. The specific sequence of PUT and GET operations to the HAS could have been established in data service computer system 106 or in client computer systems 103 or 104, or in both. The PUT or GET to HAS interaction in interaction 407 flows to HBase accelerator 101 as shown in interaction 408 transmitted on connection 107. In interaction 409, HBase accelerator 101 applies this operation directly to the HAS data it is holding in electronic memory following the processing of: (1) step 305 and step 306 for a GET; and (2) steps 307 to 311 for a PUT. As noted in step 311 and further documented in interaction 410, the update from a PUT operation is passed asynchronously to HBase 102 providing BDDB support. This interaction flows on connection 107. In interaction 411, HBase 102 providing BDDB support applies this update to its data, effectively advancing the current visible state in the BDDB with information from this one HAS update. Interaction 412 shows the results of the PUT or GET on the HAS data being returned to data service computer system 106 for its use or to be further returned to a client computer system initiating the request for a HAS data operation.

The end of HAS instance request in interaction 413 occurs when the period of intense activity of a HAS instance has ended and a new HAS instance (containing, as one possible illustrative example, the next day's arriving data in preparation) has or will be started. HBase accelerator 101 must ensure that all information in the old HAS has been migrated successfully into the BDDB and become visible there, then resources for the old HAS instance can be released. Interaction 413 shows this happening in steps. The end of HAS instance request flows in interaction 414 to HBase accelerator 101 which executed the processing steps 312 and 313. Interaction 415 consists of processing in the HAS to ensure that all messaging pipelines with asynchronous updates being sent to the BDDB to be applied there are flushed though and that the resulting update requests will have arrived at the BDDB. This is then followed in the messaging pipeline with interaction 416, forwarding the end HAS instance request to HBase 102 providing BDDB support. In interaction 417, HBase 102 tests that all PUT update messages from the old HAS instance have now been applied and that their results are visible in the BDDB. When this processing is complete an end of HAS instance response flows back to HBase accelerator 101 in interaction 418. At this point, in interaction 419, HBase accelerator 101 starts releasing resources allocated to supporting the old HAS instance, typically memory, processing capability, and persistent storage for Write Ahead Logs to facilitate establishment of a new HAS instance. Interaction 420 informs the initiating data service computer system 106 that this HAS instance is now fully processed, resources released, and data transferred to the BDDB.

Figure 5:
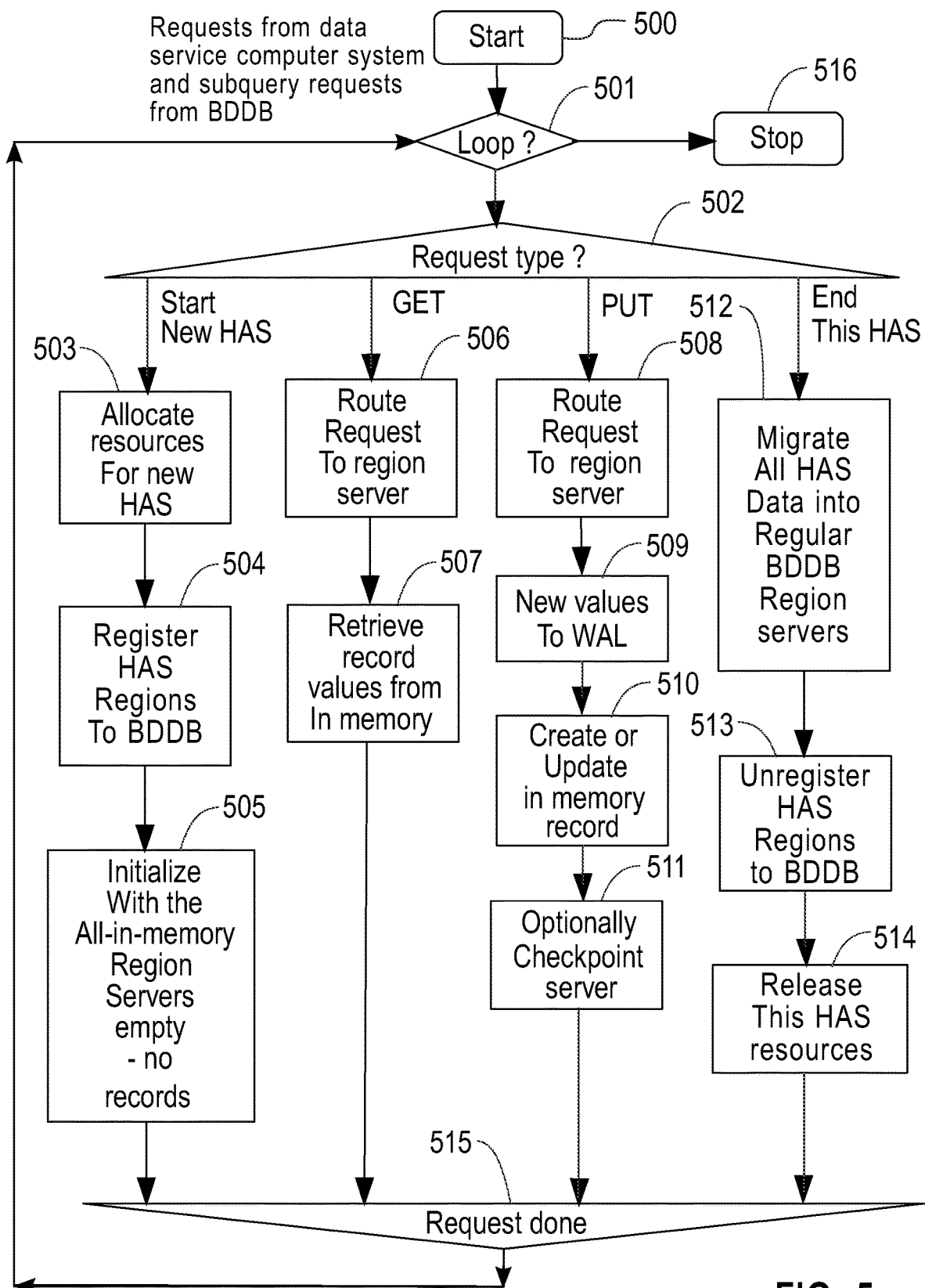
FIG. 5 is a flowchart showing the processing of operations in the HBase accelerator of FIG. 1, in accordance with an embodiment of the invention with integrated HAS and BDDB query support.

FIG. 5 is a flowchart showing the processing of operations in HBase accelerator in accordance with an embodiment of the invention with integrated HAS and BDDB query support. In this embodiment arriving information in the HAS is made immediately available to BDDB queries while it is still in HBase accelerator 101 and entirely stored in fast interactive memory. Migration of the HAS data to the BDDB where it will, in general, be stored using some combination of disk based and memory capabilities occurs after the period of activity for its HAS instance is over. Because the HAS data is still always available in fast electronic memory, performance particularly in mixed read and write workloads is still high. Additional query capability is provided to the user in that HAS data is immediately available as part of the BDDB key space but there is additional implementation complexity additional in integrating HAS and BDDB query processing.

Processing starts at step 500. Requests arriving from data service computer system 106 or in this embodiment from HBase 102 providing BDDB support are handled by an open ended loop in HBase accelerator 101. Loop decision 501 determines whether more requests are expected and stops the flow at Stop 516 if more requests are not expected.

Path selection element 502 separates out the different request types processed by HBase accelerator 101: (1) start a new HAS instance; (2) GET a record; (3) PUT a record; and (4) end this HAS instance. Start a new HAS is used when a new Highly Active Segment (HAS) instance is started, for example to capture all arriving data records occurring in a new time period. Processing of a start new HAS request begins with allocating memory, processing, directory, and log resources in HBase accelerator 101 for the new HAS instance in step 503. Step 503 includes allocation for a set of all in memory region servers for the new HAS instance and its associated partitioning of HAS key space. The allocation processing in step 503 in this embodiment is functionally the same as step 303 in FIG. 3 processing flow.

Step 504 is a differentiating processing step for this embodiment where the all in memory region servers in HBase accelerator 101 are registered with HBase 102 providing the BDDB. This means that the key space of records visible to queries in the BDDB extends to include records in the HAS with their data stored in the all in memory region servers in HBase accelerator 101. In subsequent step 505, each of the all in memory region servers are initialized to be empty, e.g., to contain no records. At the start of a new HAS instance there are no data records in the HAS. This step 505 is functionally equivalent to processing step 304 in FIG. 3.

Control then flows to the path convergence block 515 and from there back to the top of the request handling loop at loop decision 501.

Once a HAS instance is started GET and PUT requests can arrive to be handled in that HAS. A GET request is a request to retrieve the values of a particular record with a designated key in the HAS key space. In the embodiment of FIG. 5, GET requests can arrive at HBase accelerator 101 from HBase 102 providing BDDB support as a subpart of a composite query presented to HBase BDDB. This is in addition to GET requests coming to HBase accelerator 101 from data service computer system 106 as in the embodiment of FIG. 3. Processing a GET request in the embodiment of FIG. 5 is identical to the corresponding processing of the embodiment described in FIG. 3. Step 506 is functionally equivalent to step 305 in FIG. 3; step 507 is functionally equivalent to step 306 in FIG. 3. The GET request is directed to the appropriate all in memory region server by accelerator request management and directories function 204. The Get request is then handled using record values in the memory of that appropriate all in memory region server. Control then flows to path convergence block 515 and from there back to the top of the request handling loop at loop decision 501.

A PUT request is a request to either update or create a new record with specified key values. If the record already exists its field values are to be updated with data provided in the PUT requests. If that key value does not exist, a new record is to be created. In the embodiment of FIG. 5, PUT requests can arrive a part of a composite query from HBase 102 providing BDDB support, in addition to being direct requests to the HAS from data service computer system 106. Processing of the PUT request in this embodiment is similar to the corresponding processing of the embodiment described in FIG. 3 except that in this embodiment there is no requirement to forward PUT data asynchronously to the BDDB. Since the HAS is already visible to queries through the integrated query support in this environment that step is omitted. Steps 508, 509, 510 and 511, are functionally equivalent to step 307, 308, 309 and 310 in FIG. 3, respectively. The request is routed to the appropriate all in memory region server; the update is written to the Write Ahead Log (WAL); the update is applied to the record in memory in this all in memory region server after creating a new record for this requested key value if necessary. Finally periodic check pointing of the entire all in memory server memory is required to bound the log and accelerate recovery in the event of a memory server failure. Hence a decision whether a new checkpoint should be taken is included in this flow in step 511. When this sequence of PUT processing steps is complete, control flows to path convergence block 515 and from there back to the top of the request handling loop to loop decision 501.

An END HAS instance request indicates that the period of activity of this HAS instance has come to an end. For the embodiment of FIG. 5, where integrated HAS and BDDB support is provided, processing of an END HAS instance begins with migrating all the records in this HAS instance into HBase 102 providing BDDB support. While a HAS instance is active, all records in it are maintained entirely in fast electronic memory and made resilient by check pointing and a Write Ahead Log. Electronic memory is byte for byte significantly more expensive than magnetic disk storage. Prior art HBase implementation of BDDBs use disk storage and disk optimized data management protocols to reduce costs. When the active period of a HAS instance is ended, we expect a much lower rate of writing and mixed write read access to that data. Hence it becomes appropriate to migrate the information from in memory HBase accelerator 101 storage to HBase 102 supporting BDDB organized storage. Prior art HBase implementations provide utilities to migrate data from one HBase region server to another. In step 512, HBase 102 provides an extended migration path copying records from the set of all in memory region servers 201 on HBase accelerator 101 transferring it to be saved as records in one or more of HBase region servers 206 in HBase 102 providing BDDB support.

After step 512 is completed, the next step is processing an END HAS instance is to unregister the HAS all in memory region servers from the BDDB (step 513). While the HAS instance was active, having the all in memory region servers visible in the BDDB meant that data records were visible to BDDB queries as soon as they were written to memory in HBase accelerator 101. Now that the high activity period for these HAS records is ended and the records have been migrated and hence copied to lower cost HBase region servers in HBase 102 providing BDDB support, the preferred path to access the records via queries will be to use HBase region server locations. With the data from the ended HAS instance now transferred to HBase 102 and accessible exclusively by that path, resources for HBase accelerator 101, e.g., all resources associated with storing these records in electronic memory and protecting it with persistent logs and checkpoint can be dropped (step 514). Step 514 is functionally equivalent to step 313 in FIG. 3. Step 514 completes the processing of an END HAS instance operation, control flows on to path convergence block 515 and from there up to the top of the request handling loop at loop decision 501 to process the next operation in HBase accelerator 101 or to stop if there are no more operations to be handled.

Figure 6:
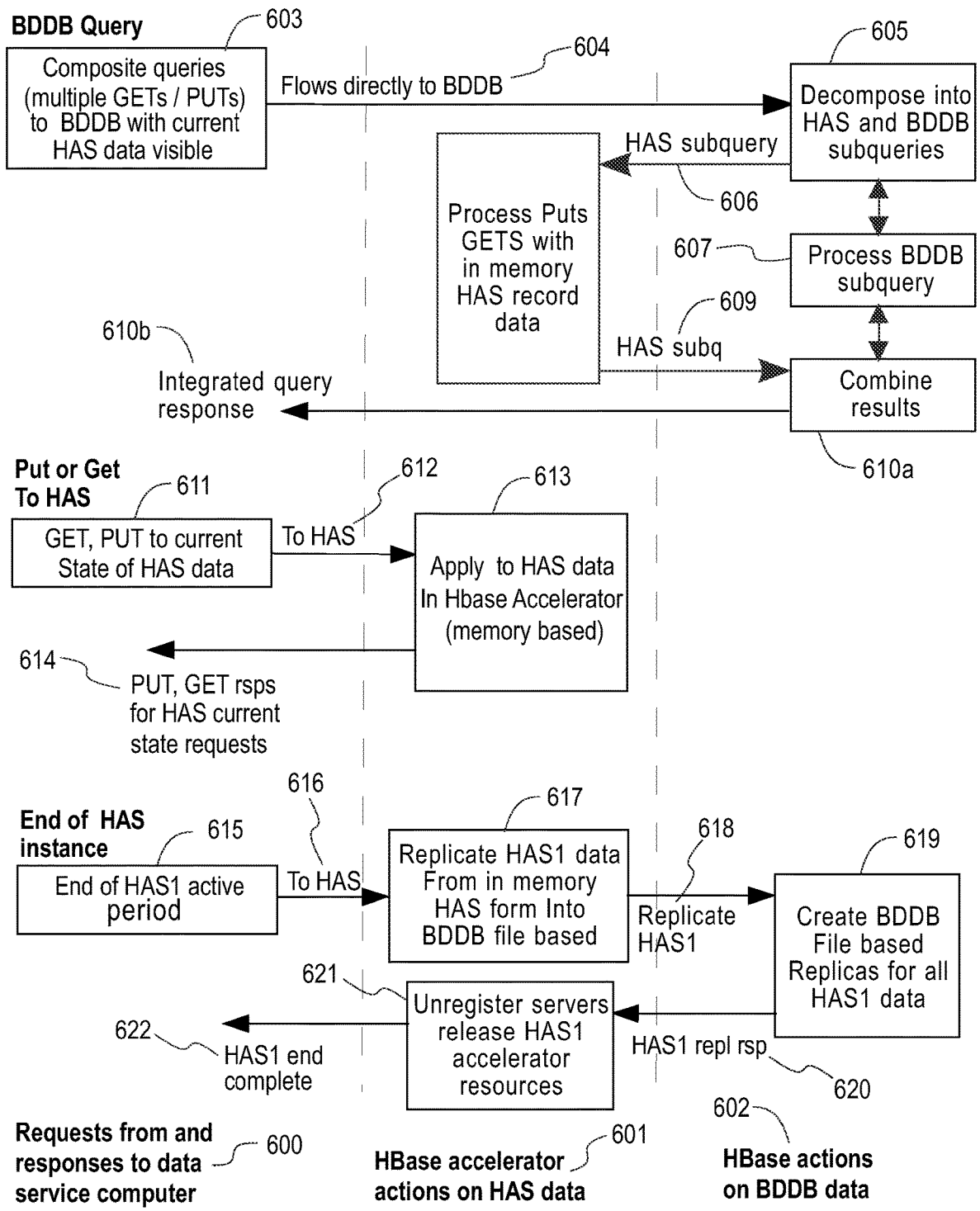
FIG. 6 is a protocol diagram showing interactions between data services computer system, the HBase accelerator, and the HBase providing BDDB implementation, in accordance with an embodiment of the invention with integrated HAS and BDDB query support.

FIG. 6 is a protocol diagram showing interactions between data services computer system 106, HBase Accelerator 101, and HBase 102 implementing a BDDB, in accordance with an embodiment of the invention with integrated HAS and BDDB query support. The operational processing on HBase accelerator 101 for this embodiment was described in reference to FIG. 5. This interaction diagram follows the same conventions as FIG. 4. In FIG. 6, the leftmost vertical column 600, shows actions, specifically requests from and responses to data services computer system 106 as it in turn serves client computer systems 103 and 104 providing them with an access path to data in the BDDB and HAS. The central column 601 shows the functions performed by HBase accelerator 101 as it processes HAS data and interacts with HBase 102 providing BDDB implementation in response to these requests. The rightmost column 602 shows functions performed by HBase 102 providing the BDDB support as part of the interactions. The interaction diagram in FIG. 6 shows three independent interactions: (1) service of a BDDB query starting at interaction 603; (2) service of PUT or GET commands to HAS data starting at interaction 611; and (3) interactions occurring at the end of the active period of a HAS instance starting at interaction 615.

The BDDB query interaction in interaction 603 occurs when one of client computer systems 103 or 104 requests data service computer system 106 to perform a composite query on the broader collection of BDDB data. A composite query consists of a set of one or more GET and PUT operations to be applied against the collection of BDDB data. In this embodiment, a query submitted to the BDDB will see all data currently available in the BDDB and all HAS records in HBase accelerator 101. The response to the query will reflect the current contents of this composite collection of data. The BDDB query flows directly to the BDDB in interaction 604 without immediate involvement of HBase accelerator 101. But in this embodiment, HBase 102 providing the BDDB implementation has enough information (resulting from the registration of the HAS all in memory region servers in the HAS instance e.g., step 504) to decompose the received query into one or more sub-queries to be submitted to the appropriate all in memory servers in HBase accelerator 101, and one or more sub-query requests to the appropriate HBase region server in HBase 102 (interaction 605). The one or more sub-queries for BDDB data are processed as BDDB queries in interaction 607. The one or more HAS sub-queries are sent to HBase accelerator 101 flowing over connection 107 (interaction 606). HBase accelerator 101 processes these sub-queries as a sequence of PUT and GET requests to its HAS data in interaction 608 using steps 506 and 507 for GETs and steps 508 through step 511 for PUT operations from FIG. 5. The results of the HAS sub-queries are returned to HBase 102 in interaction 609 and combined with the results of the BDDB sub-queries in interaction 610a. The combined results are returned to the data service computer system 106 in interaction 610b. This system of interactions enables a composite query from data service computer system 106 to receive combined results of processing the query against the entire BDDB and against the most recent data received in the HAS without duplication of any data. As in FIG. 4, composite queries against combined BDDB and HAS data may be initiated in data service computer system 106 or may be initiated by one of client computer systems 103 and 104 in which case the data service computer system 106 will return the query results to the requesting system.

The PUT or GET to HAS interaction in interaction 611, in this embodiment, occurs when one of client computer systems 103 or 104 is preparing and submitting new data associated with the current HAS and validation, data cleansing, data linking, or indexing is required in preparation for including this new information on the overall BDDB collection. Performing these validation cleansing, linking, and indexing on the HAS creates a need for a plurality of PUT and GET operations to be performed on the HAS data. If the arrival rate of new data from clients is high, efficiency and performance of these PUT and GET operations is critical. The specific sequence of PUT and GET operations to the HAS could have been established in data service computer system 106 or in client computer systems 103 or 104, or in both. The processing of these interactions is very similar to the corresponding sequence of interactions in interactions 407 through 412. The difference is this embodiment is that additional PUT and GET operation part of composite queries submitted to the BDDB may also be occurring here. It is the fact that all HAS data is maintained in fast electronic memory which assures accelerated performance in responding to mixed streams of PUTs and GETs. The PUT or GET request in interaction 611 flows to HBase accelerator 101 in interaction 612. It is applied to the HAS data in HBase accelerator 101 in interaction 613 by completing steps 506 and 507 for a GET and steps 508 through 511 for a PUT. The results are returned to data service computer system 106 in interaction 614.

The end of HAS instance interaction in interaction 615 in this embodiment occurs when the period of intense activity of a HAS instance has ended and a new HAS instance (containing, as one possible illustrative example, the next day's arriving data in preparation) has or will be started. HBase accelerator 101 must ensure that all information in the old HAS has been migrated successfully into the BDDB and become visible there, then resources for the old HAS instance can be released. Interaction 615 shows this happening in steps. The main difference between this and the corresponding interaction 413 in FIG. 4 is that in this embodiment, at the end of the HAS active period none of the data has been moved into the BDDB. That data has been made visible to BDDB requests via the integrated query capability rather than be transferring it incrementally and asynchronously. To accomplish this, the end HAS instance request, the request flows to HBase accelerator 101 in interaction 616. HBase accelerator then executes steps 512 through 514 of FIG. 5 (Interaction 617). This includes migrating all the records from the HAS so that in addition to their being stored entirely in fast electronic memory in the memory region servers in HBase accelerator 101, they are also stored and made available in one or more file based HBase region servers in HBase 102 supporting the BDDB. The replication request flows to HBase 102 providing BDDB support in interaction 618 and the creation of records in file based HBase region servers occurs in interaction 619. Completion of this action is reported back to HBase accelerator 101 in interaction 620. At this point the all in memory region servers in HBase accelerator 101 can be unregistered, since subsequent PUT and GET requests to the old HAS instance data can now all be satisfied from the file based region servers in HBase 102. Resources for the old HAS instance in HBase accelerator 101 including processing memory and persistent storage for logs and checkpoints can then be released. This is completed in interaction 621 and reported back to data services computer system 106 in interaction 622.

Figure 7:
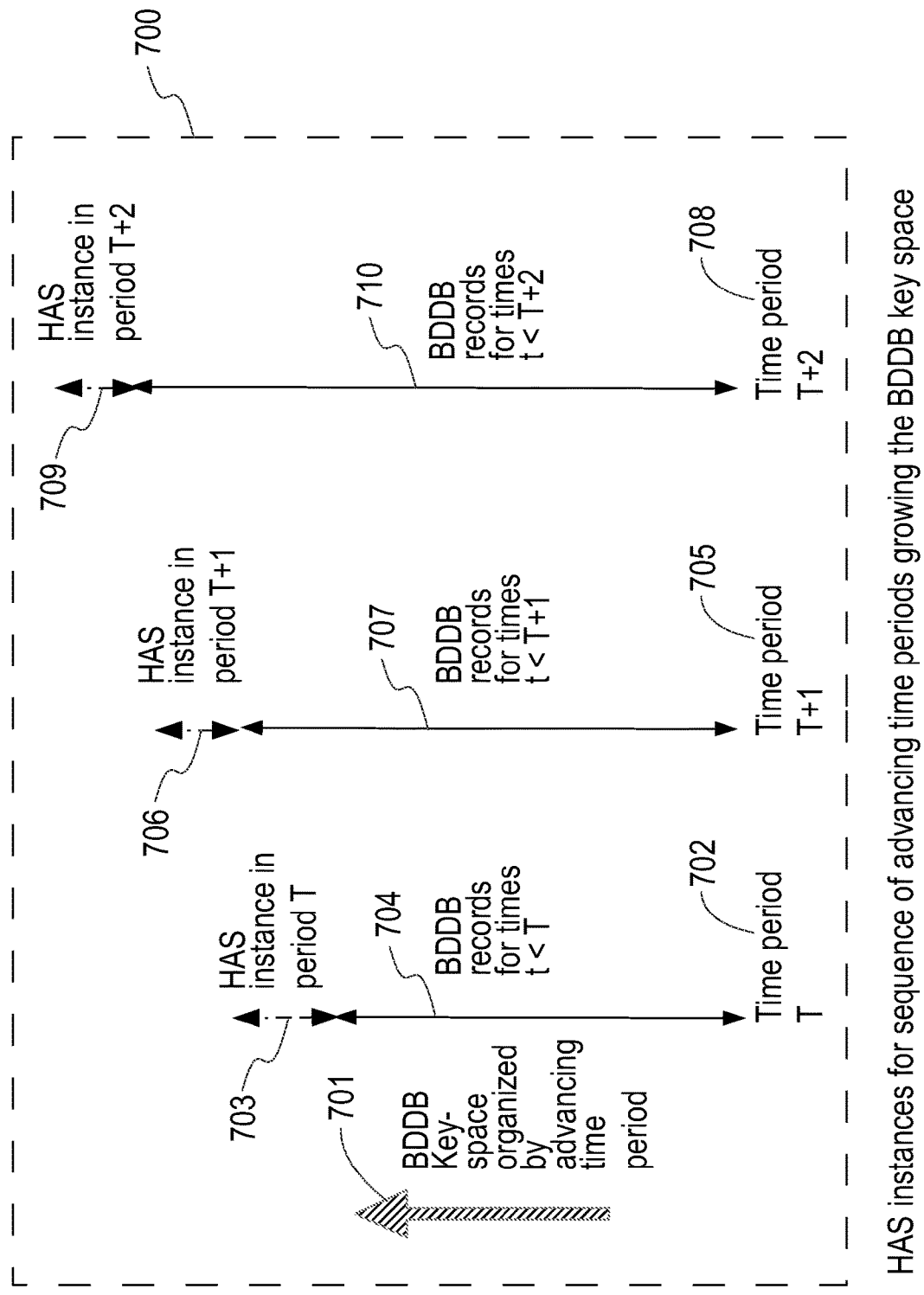
FIG. 7 shows a sequence of HAS instances at different times for an embodiment where the BDDB has key space organized by advancing time period.

FIG. 7 illustrates a sequence of HAS instances at different times for an embodiment with a BDDB implemented using an HBase or some other key record store. The key space of this BDDB is based on advancing time periods. The arriving data describing for example interactions, events or transactions is associated with the time period in which that event occurred. The majority of new events are reported in the current time period. They need to be preprocessed and inserted as keyed records in the BDDB in the current time period. Hence the localized region of most intensive data update and associated data reading to cleanse and preprocess arriving record is always for the current time period which therefore needs to be in the defined HAS instance at all times. Diagram 700 shows a sequence of HAS instances for three different time periods time periods T, T+1, T+2.

The state and position of the current HAS instance at these different times is shown by the columns of elements 702 through 704 for time period T, elements 705 through 707 for time period T+1, and elements 708 through 710 for time period T+2. Arrow 701 indicates the direction of advancing time in key space in the key space of the BDDB organized by advancing time period. In column 702, in time period T, the current HAS instance 703 is the most recent time period at the end of BDDB time key space. During this time period intense new record insertion will occur in this area of the key space and hence have associated read and write data needs met by an HBase accelerator supporting that HAS instance. BDDB records for earlier times t<T shown in element 704 may be the subject of intense query traffic but this will be a read mostly workload well addressed by existing prior art HBase and other key record store and NoSQL database techniques.

When time advances to the next period T+1, show in column 705, the HAS instance associated with period T, HAS instance 703, is ended and any data in that merged into the overall BDDB capturing all records with key values t<T+1 now shown as element 707. The new HAS instance associated with this period is HAS instance 706. Similarly in time period T+2 shown in column 708, the current HAS instance 709 is now a new instance associated with this time period, data from the T+1 HAS instance 706 has been migrated into the overall BDDB which now includes all records with key values t<T+2 shown in element 710. It is clear that this sequence can be repeated indefinitely. The overall size of the BDDB data collection and key space can be stabilized if necessary by archiving or dropping the data associated with the oldest time periods as data for new time periods is added.

Figure 8:
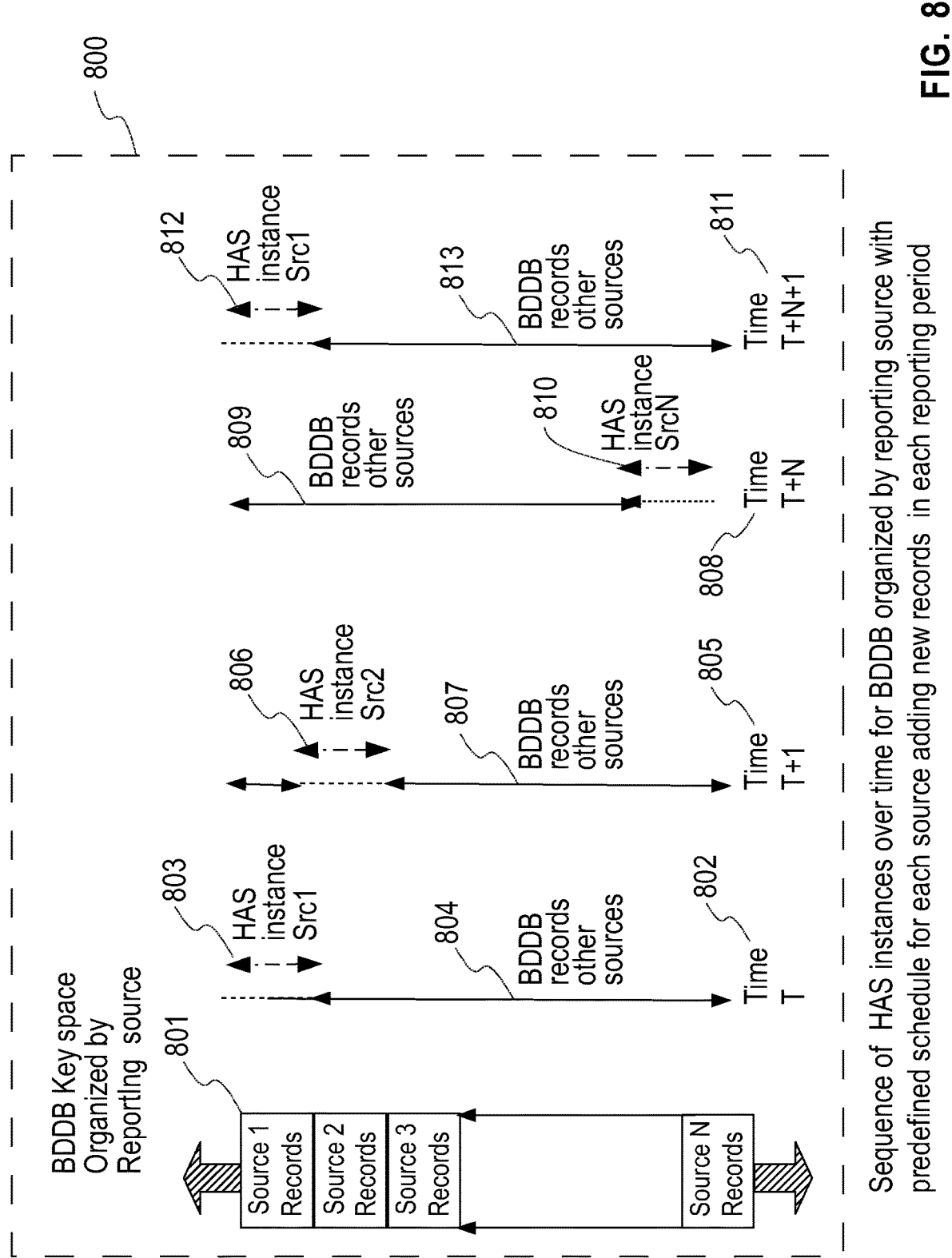
FIG. 8 shows a sequence of HAS instances at different times for an embodiment where the BDDB has key space organized by reporting source and there is a known schedule governing when different sources submit their input to be preprocessed and inserted into the BDDB.

FIG. 8 illustrates a sequence of HAS instances at different times for an alternate embodiment with a BDDB implemented using HBase or some other key record store. The key space of this BDDB is based on record sources perhaps representing different products, suborganizations, or regions each which supplies new records to be cleansed and inserted into the BDDB. The source responsible for each record is the base of its key in the BDDB key space. In this embodiment we assume that there is a well known schedule for different sources to supply their inputs to the BDDB within each reporting period. Hence the intensive area of key space for preprocessing and cleansing data rotates around the BDDB key space from source to source. In this embodiment the HAS instances will capture this movement of intense input traffic. The current HAS instance will always be located to capture the key space of sources submitting their data to the BDDB at this time.

Diagram 800 in FIG. 8 shows a sequence of HAS instances for four different times T, T+1, T+N and T+N+1 where N is the number of different reporting sources of new data submitting their data at different times. The state and position of the current HAS instance at these different times is shown by the columns of elements 802 through 804 for time period T, elements 805 through 807 for time period T+1, elements 808 through 810 for period T+N, and elements 811 through 813 for time period T+N+1. Expanded double arrow 801 indicates the organization of key space in this BDDB. Different sources of data are separated into different base regions of key space. We show sources 1, 2, 3, . . . N for this illustration. During time interval T shown as column 802, the source 1 is actively submitting new records to be preprocessed and inserted into the BDDB. Hence HAS instance 803 is set up to cover this region of key space. The BDDB in element 804 continues to serve queries and some updating for all other regions of key space and for older records from Source 1 entered before this time interval.

In time interval T+1, shown as column 805, intense input from source 1 has stopped hence HAS instance 803 is ended. New intense input comes now from source 2 and HAS instance 806 at T+1 includes that region of key space. As before the BDDB can serve queries and some updating for all other regions outside the current HAS instance including older records from source 2 as shown in element 807. This sequence of moving HAS instances can continue through key space until time interval T+N shown in column 808. At that time the current HAS instance 810 has moved to Source N and BDDB records from other sources still available for query as shown in element 809.

In the following time interval T+N+1, a new reporting cycle begins in column 811. This shows HAS instance 812 moved back to source 1 to receive fresh data from that source. The BDDB continues in element 813 to have data from the HAS instance of the previous interval merged into it and available for queries.

Figure 9:
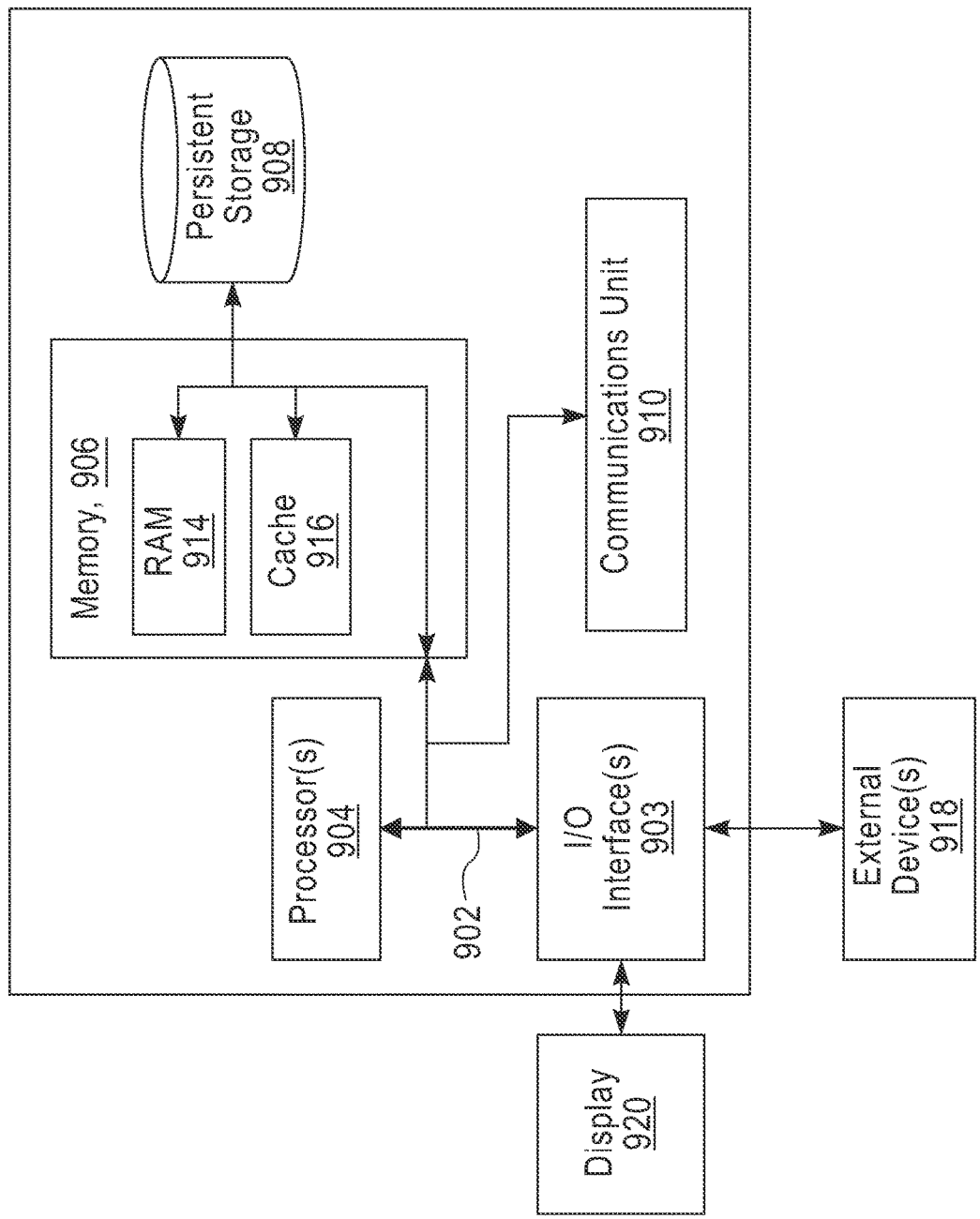
FIG. 9 depicts a block diagram of components of a computer system representative of the data services computer system, the HBase accelerator, and the HBase providing BDDB implementation of FIG. 1, in accordance with an embodiment of the present invention.

FIG. 9 depicts a block diagram of components of computer system 900 which is representative of HBase Accelerator 101, HBase 102, client computer systems 103 and 104, and data service computer system 106, in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

Computer system 900 includes communications fabric 902, which provides communications between computer processor(s) 904, memory 906, persistent storage 908, communications unit 910, and input/output (I/O) interface(s) 903. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer readable storage media. In this embodiment, memory 906 includes random access memory (RAM) 914 and cache memory 916. In general, memory 906 can include any suitable volatile or non-volatile computer readable storage media.

Program instructions and data used to practice embodiments of the present invention may be stored in persistent storage 908 for execution by one or more of the respective computer processor 904 via one or more memories of memory 906. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Program instructions and data used to practice embodiments of the present invention may be downloaded to persistent storage 908 through communications unit 910.

I/O interface(s) 903 allows for input and output of data with other devices that may be connected to each computer system. For example, I/O interface 903 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention can be stored on such portable computer readable storage media and can be loaded onto persistent storage 908 via I/O interface(s) 903. I/O interface(s) 903 also connect to a display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for improving performance of a database, the method comprising:
    creating, in a volatile memory, an instance of a segment of data corresponding to a segment of data in a key-value database on a persistent file system that is distributed among multiple computing systems, wherein the segment of data in the key-value database on the persistent file system is (i) only a portion of a data stored in the key-value database on the persistent file system and (ii) is included in a set of data segments that are predicted to experience at least a plurality of reads and writes above a threshold during a certain time period;
    during the certain time period, responsive to receiving a request to modify the segment of data in the key-value database on the persistent file system, generating a modified segment of data by updating, by one or more processors, a content of the instance of the segment of data in the volatile memory based, at least in part, on the request; and
    responsive to both of (i) a time period elapsing during the certain time period and (ii) a creation, in the volatile memory, and during the certain time period, of a new instance of the segment of data corresponding to the segment of data, updating the segment of data in the key-value database on the persistent file system based on the modified segment of data.

2. The method of claim 1, further comprising:
    determining, by one or more processors, that the segment of data in the database on the persistent file system is included in the set of data segments based on one or both of (i) a key value of the segment of data in the key-value database and (ii) a value in the segment of data in the database being linked to data which is known to be included in the set of data segments; and
    updating, by one or more processors, the segment of data in the key-value database on the persistent file system with the requested modification, wherein the database uses a key-value data model that organizes data using a multidimensional sorted map, which is indexed by row key, column key, and timestamp.

3. The method of claim 1, further comprising:
    logging, in a log file, the request to modify the segment of data in the key-value database on the persistent file system, wherein the log file is stored in persistent storage, wherein the persistent storage stores data in non-volatile memory.

4. The method of claim 1, further comprising:
in response to the certain time period ending, ending the created instance of the segment of data in the key-value database on the persistent file system.

5. The method of claim 4, wherein the step of, in response to the certain time period ending, ending the created instance of the segment of data in the key-value database on the persistent file system, comprises:
in response to the certain time period ending, updating, by one or more processors, the segment of data in the key-value database on the persistent file system with the requested modification; and
ending the created instance of the segment of data in the key-value database on the persistent file system.

6. The method of claim 1, further comprising:
receiving a request to retrieve a value from the segment of data in the key-value database on the persistent file system; and
retrieving, by one or more processors, the value from the instance of the segment of data in the volatile memory.

7. The method of claim 1, wherein the request to modify comprises one of the following: a request to create a record in the segment of data in the key-value database on the persistent file system; and a request to modify an existing record in the segment of data in the key-value database on the persistent file system.

8. A computer program product for improving performance of a database, computer program product comprising:
one or more computer readable storage media and program instructions stored on the one or more computer readable storage media, the program instructions comprising:
program instructions to create, in a volatile memory, an instance of a segment of data corresponding to a segment of data in a key-value database on a persistent file system that is distributed among multiple computing systems, wherein the segment of data in the key-value database on the persistent file system is (i) only a portion of a data stored in the key-value database on the persistent file system and (ii) is included in a set of data segments that are predicted to experience at least a plurality of reads and writes above a threshold during a certain time period;
program instructions to respond to reception of a request to modify the segment of data in the key-value database on the persistent file system during the certain time period, by generating a modified segment of data by updating a content of the instance of the segment of data in the volatile memory based, at least in part, on the request; and
program instructions to respond to both of (i) a time period elapsing during the certain time period and (ii) a creation, in the volatile memory and during the certain time period, of a new instance of the segment of data corresponding to the segment of data, by updating the segment of data in the key-value database on the persistent file system based on the modified segment of data.

9. The computer program product of claim 8, further comprising program instructions, stored on the one or more computer readable storage media, to:
determine that the segment of data in the key-value database on the persistent file system is included in the set of data segments based on one or both of (i) a key value of the segment of data in the database and (ii) a value in the segment of data in the database being linked to data which is known to be included in the set of data segments; and
update the segment of data in the key-value database on the persistent file system with the requested modification, wherein the database uses a key-value data model that organizes data using a multidimensional sorted map, which is indexed by row key, column key, and timestamp.

10. The computer program product of claim 8, further comprising program instructions, stored on the one or more computer readable storage media, to:
log, in a log file, the request to modify the segment of data in the key-value database on the persistent file system, wherein the log file is stored in persistent storage, wherein the persistent storage stores data in non-volatile memory.

11. The computer program product of claim 8, further comprising program instructions, stored on the one or more computer readable storage media, to:
in response to the certain time period ending, end the created instance of the segment of data in the key-value database on the persistent file system.

12. The computer program product of claim 11, wherein the program instructions to, in response to the certain time period ending, end the created instance of the segment of data in the key-value database on the persistent file system, comprise program instructions to:
in response to the certain time period ending, update the segment of data in the key-value database on the persistent file system with the requested modification; and
end the created instance of the segment of data in the key-value database on the persistent file system.

13. The computer program product of claim 8, further comprising program instructions, stored on the one or more computer readable storage media, to:
receive a request to retrieve a value from the segment of data in the key-value database on the persistent file system; and
retrieve the value from the instance of the segment of data in the volatile memory.

14. The computer program product of claim 8, wherein the request to modify comprises one of the following: a request to create a record in the segment of data in the key-value database on the persistent file system; and a request to modify an existing record in the segment of data in the key-value database on the persistent file system.

15. A system for improving performance of a database, computer program product comprising:
one or more computer processors, one or more computer readable storage media, and program instructions stored on the computer readable storage media for execution by at least one of the one or more processors, the program instructions comprising:
program instructions to create, in a volatile memory, an instance of a segment of data corresponding to a segment of data in a key-value database on a persistent file system that is distributed among multiple computing systems, wherein the segment of data in the key-value database on the persistent file system is (i) only a portion of a data stored in the key-value database on the persistent file system and (ii) is included in a set of data segments that are predicted to experience at least a plurality of reads and writes above a threshold during a certain time period;

program instructions to respond to reception of a request to modify the segment of data in the key-value database on the persistent file system during the certain time period, by generating a modified segment of data by updating a content of the instance of the segment of data in the volatile memory based, at least in part, on the request; and program instructions to respond to both of (i) a time period elapsing during the certain time period and (ii) a creation, in the volatile memory and during the certain time period, of a new instance of the segment of data corresponding to the segment of data, by updating the segment of data in the key-value database on the persistent file system based on the modified segment of data.

16. The system of claim 15, further comprising program instructions, stored on the one or more computer readable storage media for execution by at least one of the one or more processors, to:

determine that the segment of data in the key-value database on the persistent file system is included in the set of data segments based on one or both of (i) a key value of the segment of data in the database and (ii) a value in the segment of data in the database being linked to data which is known to be included in the set of data segments; and update the segment of data in the key-value database on the persistent file system with the requested modification, wherein the database uses a key-value data model that organizes data using a multidimensional sorted map, which is indexed by row key, column key, and timestamp.

17. The system of claim 15, further comprising program instructions, stored on the one or more computer readable storage media for execution by at least one of the one or more processors, to:

log, in a log file, the request to modify the segment of data in the key-value database on the persistent file system, wherein the log file is stored in persistent storage, wherein the persistent storage stores data in non-volatile memory.

18. The system of claim 15, further comprising program instructions, stored on the one or more computer readable storage media for execution by at least one of the one or more processors, to:

in response to the certain time period ending, end the created instance of the segment of data in the key-value database on the persistent file system.

19. The system of claim 18, wherein the program instructions to, in response to the certain time period ending, end the created instance of the segment of data in the key-value database on the persistent file system, comprise program instructions to:

in response to the certain time period ending, update the segment of data in the key-value database on the persistent file system with the requested modification; and end the created instance of the segment of data in the key-value database on the persistent file system.

20. The system of claim 18, further comprising program instructions, stored on the one or more computer readable storage media for execution by at least one of the one or more processors, to:

receive a request to retrieve a value from the segment of data in the key-value database on the persistent file system; and retrieve the value from the instance of the segment of data in the volatile memory.

\* \* \* \* \*